United States Patent
Branover et al.

(10) Patent No.: US 8,291,249 B2
(45) Date of Patent: Oct. 16, 2012

(54) METHOD AND APPARATUS FOR TRANSITIONING DEVICES BETWEEN POWER STATES BASED ON ACTIVITY REQUEST FREQUENCY

(75) Inventors: Alexander Branover, Chestnut Hill, MA (US); Denis Rystsov, Arlington, MA (US); Maurice B. Steinman, Marlborough, MA (US); Jonathan M. Owen, Northborough, MA (US); Denis J. Foley, Shrewsbury, MA (US)

(73) Assignee: Advanced Micro Devices, Inc., Austin, TX (US)

( * ) Notice: Subject to any disclaimer, the term of this patent is extended or adjusted under 35 U.S.C. 154(b) by 487 days.

(21) Appl. No.: 12/566,930

(22) Filed: Sep. 25, 2009

(65) Prior Publication Data

US 2011/0078478 A1 Mar. 31, 2011

(51) Int. Cl.
*G06F 1/32* (2006.01)
(52) U.S. Cl. ........................... 713/323; 713/320
(58) Field of Classification Search ............... 713/323, 713/320
See application file for complete search history.

(56) References Cited

U.S. PATENT DOCUMENTS

| | | | |
|---|---|---|---|
| 7,966,506 B2 * | 6/2011 | Bodas et al. | 713/323 |
| 8,112,651 B2 * | 2/2012 | Wang et al. | 713/323 |
| 2006/0031692 A1 | 2/2006 | Kato et al. | 713/300 |
| 2007/0157042 A1 | 7/2007 | Jahagirdar et al. | 713/320 |
| 2008/0141265 A1 * | 6/2008 | Choi | 718/105 |
| 2009/0235105 A1 | 9/2009 | Branover et al. | 713/330 |

OTHER PUBLICATIONS

PCT Search Report and Written Opinion from PCT/US2010/049265 dated May 25, 2011.

* cited by examiner

*Primary Examiner* — Albert Wang
(74) *Attorney, Agent, or Firm* — Williams, Morgan & Amerson, P.C.

(57) ABSTRACT

A method for transitioning power states in a device includes designating a first reduced power state as a target power state. A first expected residency for the target power state is determined based on a counting of activity requests associated with the device. The device is transitioned to the target power state responsive to the expected residency satisfying a first predetermined threshold.

24 Claims, 6 Drawing Sheets

METHOD AND APPARATUS FOR TRANSITIONING DEVICES BETWEEN POWER STATES BASED ON ACTIVITY REQUEST FREQUENCY

CROSS-REFERENCE TO RELATED APPLICATIONS

Not applicable.

BACKGROUND

The disclosed subject matter relates generally to electronic devices having multiple power states and, more particularly, to a method and apparatus for transitioning devices between power states based on activity request frequency.

The ever increasing advances in silicon process technology and reduction of transistor geometry makes static power (leakage) a more significant contributor in the power budget of integrated circuit devices, such as processors (CPUs). To attempt to reduce power consumption, some devices have been equipped to enter one or more reduced power states. In a reduced power state, a reduced clock frequency and/or operating voltage may be employed for the device.

FIG. 1 is a diagram 100 illustrating conceptually a trade-off between transitioning into a reduced power state and state residency. The active state is designated as the C0 state, and a particular reduced power state is designated as Cn. The value of n may change depending on how deep the power state is (i.e., higher value of n reflects a deeper power state. The reduced power state may be broken down into three regions, Cn state entry (i.e., from the current power state to the reduced power state), Cn state residency, and Cn state exit (i.e., from the reduced power state to an exit power state, which may be different than the current power state), each consuming different amounts of energy. Energy consumed during entry and exit transitions is dependent on transition activity and the time spent for the transition. Although sharp transitions are illustrated in FIG. 1, the actual transitions are generally ramped transitions. As a general rule—the deeper the power state, the longer the transition time required and the more energy consumed getting to the state. A reduced power state Cn is considered an efficient state (i.e., recommended to be entered) only if its Cn residency is sufficiently long to make the overall power consumption getting into and out of the reduced power state and spent in the reduced power state lower than the power consumption in the original power state for the same duration.

FIG. 1 shows various power levels associated with the device, such as C0 active and idle powers, Cn entry, exit, and idle powers, and a zero power level. When comparing transitions to various available power states, it is useful to compare the transitional energy of a particular power state and the power saved during the Cn residence to the power that would have been consumed without the power state transition. As seen in FIG. 1, the energy consumed during the Cn entry region, En(entry), is the difference between the Cn entry power level and the C0 idle power level (i.e., which would have been consumed if the device were left idle in the C0 state) integrated over the Cn entry time. Similarly, the energy consumed during the Cn exit region, En(exit), is the difference between the Cn exit power level and the C0 idle power level integrated over the Cn entry time. The energy saved during the Cn residency region, $En(\Delta)$, is the difference between the C0 idle power and the Cn idle power integrated over the Cn residency time. Hence, En(entry) and En(exit) represent the energy cost of transitioning to the reduced power state, while $En(\Delta)$ represents the energy savings realized during the reduced power state residency.

Reduced power state Cn is considered an efficient state (i.e., recommended to be entered) only if its Cn state residency is sufficiently long to make the overall energy savings in the Cn state greater than the energy consumption during the power state transitions.

$$E_n(\Delta) > E_n(\text{entry}) + E_n(\text{exit}).$$

When comparing two candidate reduced power states, reduced power state Cn is more efficient that reduced power state Ck if:

$$E_n(\Delta) - E_n(\text{entry}) - E_n(\text{exit}) > E_k(\Delta) - E_k(\text{entry}) - E_k(\text{exit}).$$

There is a cost to transitioning to a reduced power state defined by the entry and exit power consumption. The deeper the power state is, the longer it takes to transition in and out of it. Longer transition latency makes the state both less power efficient and introduces functional risk for workloads requiring well-bounded interrupt latency (e.g., playbacks, network workloads, Sysmark Benchmark, etc.) The problem of interrupt latency is generally addressed by design methods that seek to reduce exit latency (e.g., faster voltage and/or frequency ramp-up, faster restore of the processor state in cases where the processor loses its state in the reduced power state, etc.).

To lower overall power, if there is a power penalty associated with transitioning to a lower power state, the residency in the lower power state must be such that the power associated with the transition into and out of the state added to the power consumed in the lower power state must be lower than if no state transition had occurred.

Transitioning to lower power states may impose performance constraints on the system—for example, low power states may add to the time to service interrupts. The deeper the reduced power state, the longer it takes to transition back to the operational state. This extra latency may have a negative effect on performance of some video, audio or network applications that are very sensitive to long interrupt service latency. This sensitivity may be perceived as user-visible or user-audible real-time artifacts (i.e., lost frames, late audio stream, etc.) or may be manifested as an underperformance of the application. If this happens on a frequent basis the performance loss or real-time effects become more apparent, negatively impacting the user experience.

For microprocessors, currently known Advanced Configuration and Power Interface (ACPI) and ACPI-based low-power states have been employed to reduce dynamic power consumption and reduce CPU static power. ACPI is an open industry standard that defines common interfaces for hardware recognition, motherboard and device configuration, and power management. A widely recognized element of ACPI is power management—giving the Operating System (OS) control of power management, in contrast with prior models where power management control was mainly under the control of the Basic Input/Output System (BIOS), with limited intervention from the OS. In ACPI, BIOS provides the OS with methods for directly controlling the low-level details of the hardware, providing the OS with nearly complete control over the power saving schemes.

The ACPI standard specifies various groups of states, among them global states, device states, performance states, and processor states. For example, the ACPI standard defines four processor power states, C0-C3. C0 is the operating state. C1 (often referred to as Halt state) is a state in which the processor is not executing instructions, but can (essentially) instantaneously return to an executing state. C2 (often known as Stop-Clock state) is a state in which the processor stops clocks but maintains cache contents and all software-visible state data. Because cache contents are maintained in C2, the processor must still service coherency probes. C3 (often known as Sleep state) is a state in which the processor maintains cache contents and software state, but lowers voltage to a level sufficient to maintain the saved state. While the ACPI standard specifies 4 states (C0-C3), processors can have independently-defined hardware states beyond C3 representing progressively lower power states. Incremental improvements can be made by flushing cache contents so that the core no longer needs to participate in coherency probes (C5 state). The lowest power state is achieved when the processor cache contents and software context are saved and supply voltage is reduced to eliminate leakage. (C6 state).

It should be noted that the C6-state is not equivalent to system sleep state S3 where most of the system is powered down, and restoration to the C0-state requires an extended period of time, oftentimes in the range of many seconds. The C6-state can be applied to a single-core processor or to any core or group of cores in multi-core processors, while keeping other cores and system components (chipset, I/O, DRAM) in fully functional states. At the moment the OS indicates the need for allocating some task/process on a given CPU that is presently in the C6-state, that CPU is powered-up and becomes available for executing the requested task/process. Effectively managing a processor's transitioning in and out of the C6-state can lead to improved power management and result in reduced overall power consumption.

This section of this document is intended to introduce various aspects of the art that may be related to different aspects of the disclosed subject matter described and/or claimed below. This section provides background information to facilitate a better understanding of the different aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for transitioning power states in a device. The method includes designating a first reduced power state as a target power state. A first expected residency for the target power state is determined based on a counting of activity requests associated with the device. The device is transitioned to the target power state responsive to the expected residency satisfying a first predetermined threshold.

Another aspect of the disclosed subject matter is seen in an apparatus including control logic operable to designate a first reduced power state for a device as a target power state, determine a first expected residency for the target power state based on a counting of the activity requests associated with the device, and transition the device to the target power state responsive to the expected residency satisfying a first predetermined threshold.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
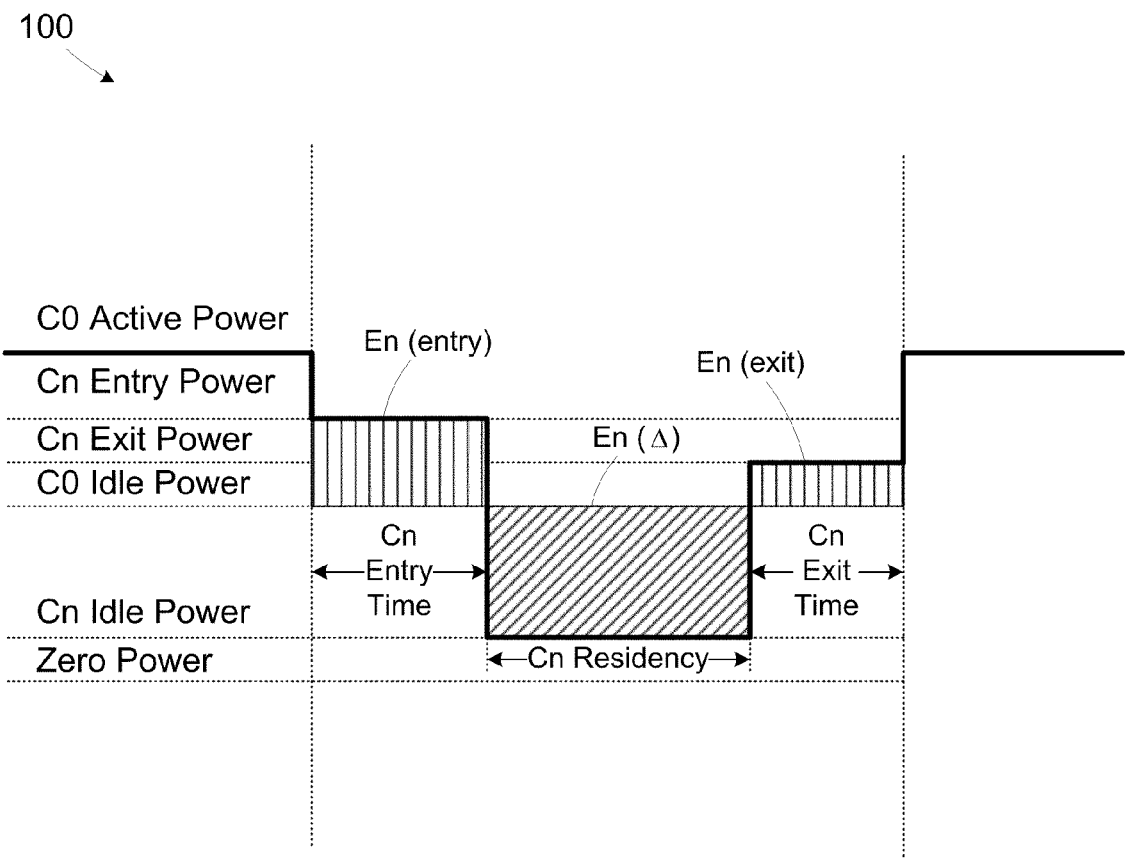
FIG. 1 is a conceptual diagram illustrating the transitioning between power states to illustrate state residency trade-off between transition times and power.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
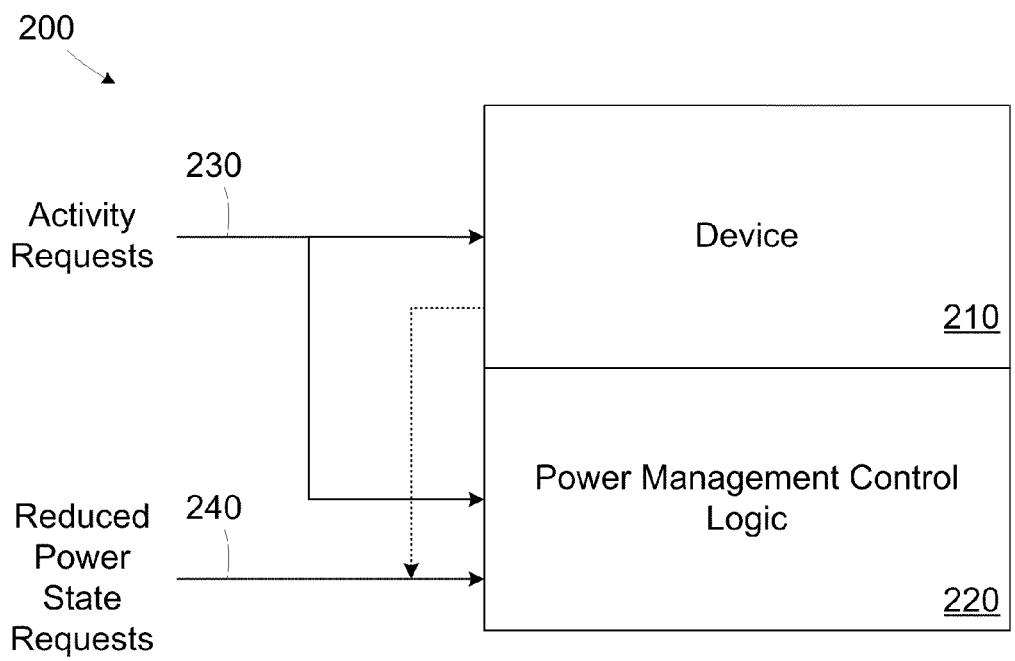
FIG. 2 is a simplified block diagram of a system having a device that transitions between power states and power management control logic operable to control the transitions based on activity request rates.

Referring now to the drawings wherein like reference numbers correspond to similar components throughout the several views and, specifically, referring to FIG. 2, the disclosed subject matter shall be described in the context of a system 200 including a device 210 capable of operating in a plurality of power modes and power management control logic 220 operable to control the transitioning of the device 210. The device 210 may be a digital device (e.g., a central processing unit (CPU), a microcontroller, a digital signal processing (DSP) unit, a graphics processing unit (GPU), memory device, etc.), an analog device, or a mixed analog-digital device (e.g., transceiver). In general, the device 210 may be any type of device that has a plurality of power states and operates responsive to activity requests 230, such as interrupts, general purpose events, etc., that indicate when the device needs to be in an operational state. The activity requests 230 may be internal or external requests, depending on the specific nature of the device 210. The device 210 may also receive reduced power state requests 240 through the power management control logic 220 due to actual or anticipated idleness (e.g., based on a software or operating system (OS) request). Alternatively, the reduced power state request may be generated internally (e.g., based on an interrupt generated by the device 210 itself), as represented by the phantom line in FIG. 2. The power management control logic 220 may be integrated into the device 210 or separate from the device 210.

For purposes of illustration, the subject matter is described as it may be implemented to control the transitioning of a microprocessor between power states. The microprocessor may be a single core processor or an individual core of a multi-core microprocessor. The power management control logic 220 may be implemented in the microprocessor (i.e., on the same die) or external thereto (e.g., implemented in a North Bridge controller).

Figure 3:
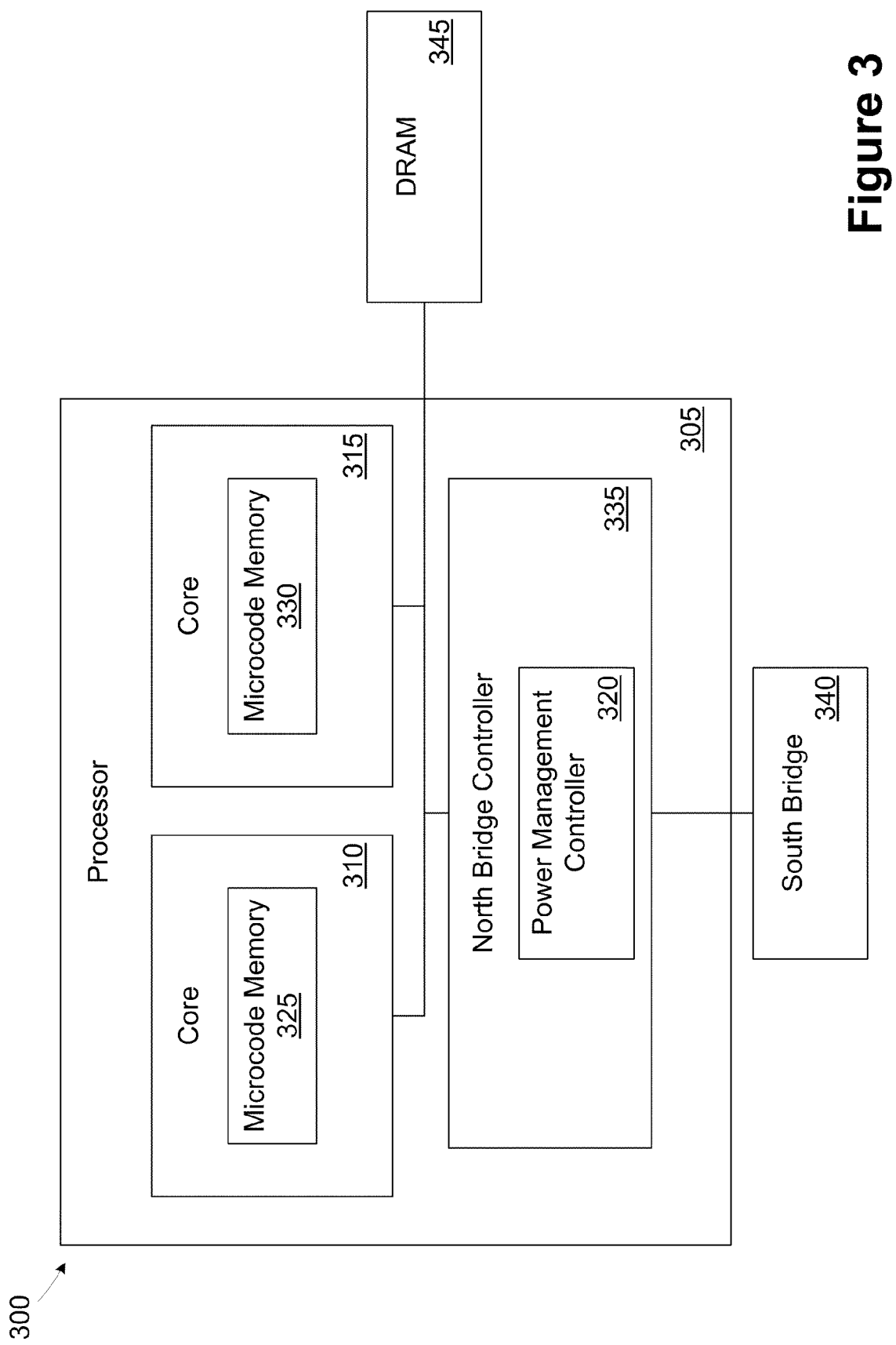
FIG. 3 is a partial logic block diagram of one embodiment of a computer system that includes a processor having one or more cores configured to transition between power states.

FIG. 3 is a partial logic block diagram showing one embodiment of a computer system 300 that includes a processor 305 comprising one or more cores 310, 315 configured to transition between power states, e.g. C-states using a protocol (which, in some embodiments, may be considered a "handshake" protocol) between a power management controller 320 (i.e., implementing the control logic 220 of FIG. 2) configured on the processor 305, and microcode that is stored in microcode memory 325, 330 (e.g., ROM or RAM) and executing on one of the processor cores (i.e., the processor core 310, 315 that is to transition to a Cn state). The power management controller 320 may in general be a circuit or logic configured to perform one or more functions in support of the one or more cores 310, 315 situated on the processor 305. The power management controller 320 may include one or more circuits configured to perform one or more functions that may together comprise the full functionality of the power management controller 320.

In the illustrated embodiment of FIG. 3, the power management controller 320 is implemented in a North Bridge (NB) controller 335, which may include a circuit (or sub-circuit) configured to perform power management control as one of the functions of the overall functionality of NB controller 335. Furthermore, in other embodiments, the circuit represented by the NB controller 335 may also be implemented as a distributed circuit, in which respective portions of the distributed circuit may be configured in one or more of the processor cores 310, 315, but operating on separate power planes, that is, using a different power supply than the section or sections of the cores 310, 315 functionally distinct from the portion or portions of the distributed circuit. The separate power planes, or distinct/separate power supplies may thereby enable each respective portion of the distributed circuit to perform its functions even when the rest of the processor core (e.g., the respective main section or sections of the processor core 310, 315 that are functionally distinct from the respective portion of the distributed circuit) is in a reduced power state. This power independence enables embodiments that feature a distributed circuit, distributed controller, or distributed control circuit performing at least some or all of the functions performed by NB controller 335 shown in FIG. 3.

The power management controller 320 may be configured to communicate with each core 310, 315. More specifically, the power management controller 320 may be configured to handle C-state requests received from the cores 310, 315 and interface with the microcode memories 325, 330, respectively, to provide action requests and receive action acknowledgement to/from the microcode executing on core 310 and/or 315. The NB controller 335 may also interface with a south bridge (SB) 340, and system memory, such as DRAM 345. The power management controller 320 may also provide control over the supply voltage and operating clock of each core and may determine whether transitioning to a requested C-state is to be performed.

In one embodiment, either operating system or hardware-based inference logic tracking the idle states of the cores 310, 315 may request one or more cores 310, 315 of the processor 305 to transition into a reduced power state (e.g., a C6 (0V) state). As used herein, C6-state refers to a zero-power state, which may itself refer to a zero-volt (0V) state. In certain embodiments, a zero-power state may be defined as a lowest-voltage state that is not exactly 0V, based on the particular requirements of any given system. Those of ordinary skill in the art will appreciate that zero-power state is not necessarily limited to 0V, and the protocol described herein may be used for transitioning to any reduced power state.

In one example, transitioning to C6-state may include the steps of storing (flushing) the updated contents of the processor caching system (e.g., L1, L2, L3, etc.) to the main (system) memory, saving the architectural and system state in some powered-on storage, turning down the processor clocking system, and reducing the supply voltage (powering the processor core) to 0V. The architectural and system state may need to be saved to correctly and deterministically resume execution of the instruction stream when the processor core 310, 315 is transitioned back into the operational (C0) state. The architectural and system state may be saved either in external memory (e.g. system memory, DRAM, non-volatile memory, or the like) or in some on-die storage capacity that is not powered down in C6-state, and would therefore be configured outside of the processor core 310, 315 being placed in the C6-state. A processor core residing in C6-state may transition back to the operational state (C0) when one or more tasks need to be allocated to the processor core for execution. This transition may be requested via an interrupt signal or message. Transitioning from a C6-state to a C0-state may include the steps of restoring the supply voltage level of the processor core 310, 315 to the operational level, relocking the PLL, resetting the internal state of the core 310, 315, and restoring the architectural and system states by reading the saved state from the external memory or on-die storage capacity where it was stored during transitioning to C6-state.

It should be noted that while one or more processor cores 310, 315 of a multi-core processor 305 are in C6-state, other cores 310, 315 may remain in a fully operational state, executing tasks. If I/O devices send coherent probes while a processor core 310, 315 is in a C6-state, the caching system of the core 310, 315 need not be snooped, since its modified contents would have been saved in main memory during the transition to the C6-state.

Figure 4:
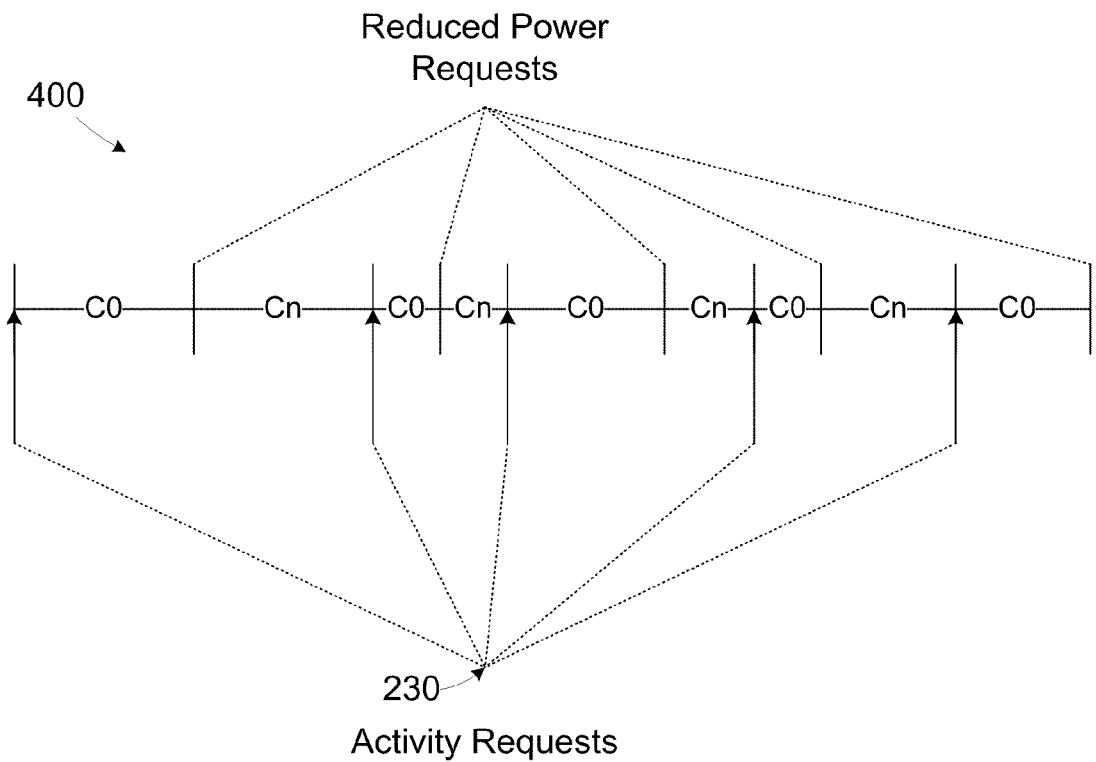
FIG. 4 is a diagram illustrating active and idle states of a device as impacted by activity requests.

FIG. 4 is a diagram 400 illustrating active and idle states of the device 210 as impacted by activity requests 230, such as interrupts. The frequency at which activity requests 230 are received (i.e., the interrupt rate of the system) is one of the factors that may be analyzed to help optimize power savings when placing the device 210, such as a processor core 310, 315 (or multiple processor cores), in a reduced power state. Another factor is the length of the time interval that the device 210 is in the active state following an activity request 230 (i.e., residency time in the active state, C0). The activity requests 230 are main factors in limiting reduced power state residency (i.e., Cn-residency). Unexpected activity requests can make the power state transitioning inefficient.

The power management control logic 220 (e.g., the power management controller 320) maintains an activity request counter for each power state to provide a measure of expected low power state residency. The lower the activity request (i.e., interrupt) rate, the longer the expected residency. The power management control logic 220 also employs minimal residency thresholds for each power state, as shown in Table 1. The particular values for the rates and residency thresholds may vary depending on the particular configuration of the device 210. For example, in a system configuration favoring performance, the residency thresholds may be higher (i.e., the tolerated activity rate is lower), while in a system configuration favoring power savings, the residency thresholds may be lower (i.e., the tolerated activity rate is higher).

TABLE 1

Activity Rate Thresholds

| Reduced Power State | Tolerated Activity Rate | Residency Threshold |
|---|---|---|
| C1 | Activity_Rate_1 | ResThresh_1 |
| C2 | Activity_Rate_2 | ResThresh_2 |
| ... | ... | ... |
| Cn-1 | Activity_Rate_n-1 | ResThresh_n-1 |
| Cn | Activity_Rate_1_n | ResThresh_n |

Figure 5:
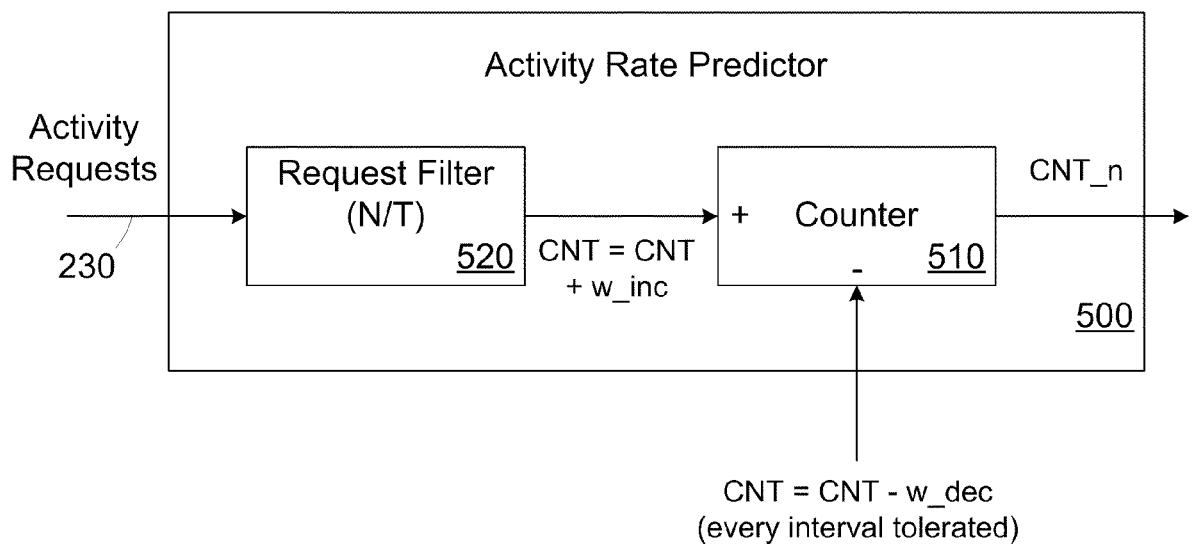
FIG. 5 is a simplified block diagram of an activity rate predictor that may be used in the power management control logic of FIG. 2.

FIG. 5 illustrates an exemplary power state activity rate predictor 500 that may be employed by the power management control logic 220 for evaluating the expected residencies for the various power states. The activity rate predictor 500 includes a counter 510 and a request filter 520. The request filter 520 limits the number of activity requests, N, that may be recorded in a predetermined time interval, T, to filter out interrupt bursts not properly representing IO activity, thereby preventing over-incrementing the counter 510. The counter 510 is incremented (CNT=CNT+w_inc) for each activity request (i.e., interrupt) output by the request filter 520. The counter is decremented (CNT=CNT−w_dec) for every time interval that elapses that is greater than or equal to the configurable time interval corresponding to the Activity_Rate_n parameter for the subject power state. For example, the time interval may be the reciprocal of the tolerated activity rate.

The increment and decrement rates, w_inc and w_dec, may be set at different levels to set the relative aggressiveness of the power saving scheme. For example, in a system configuration favoring performance, the increment weight may be set higher than the decrement weight, while in a system configuration favoring power savings, the decrement weight may be set higher. In a balanced configuration the weights may be equal. The value of N for the request filter 520 may also vary, and may be configured by the operating system or software.

Figure 6:
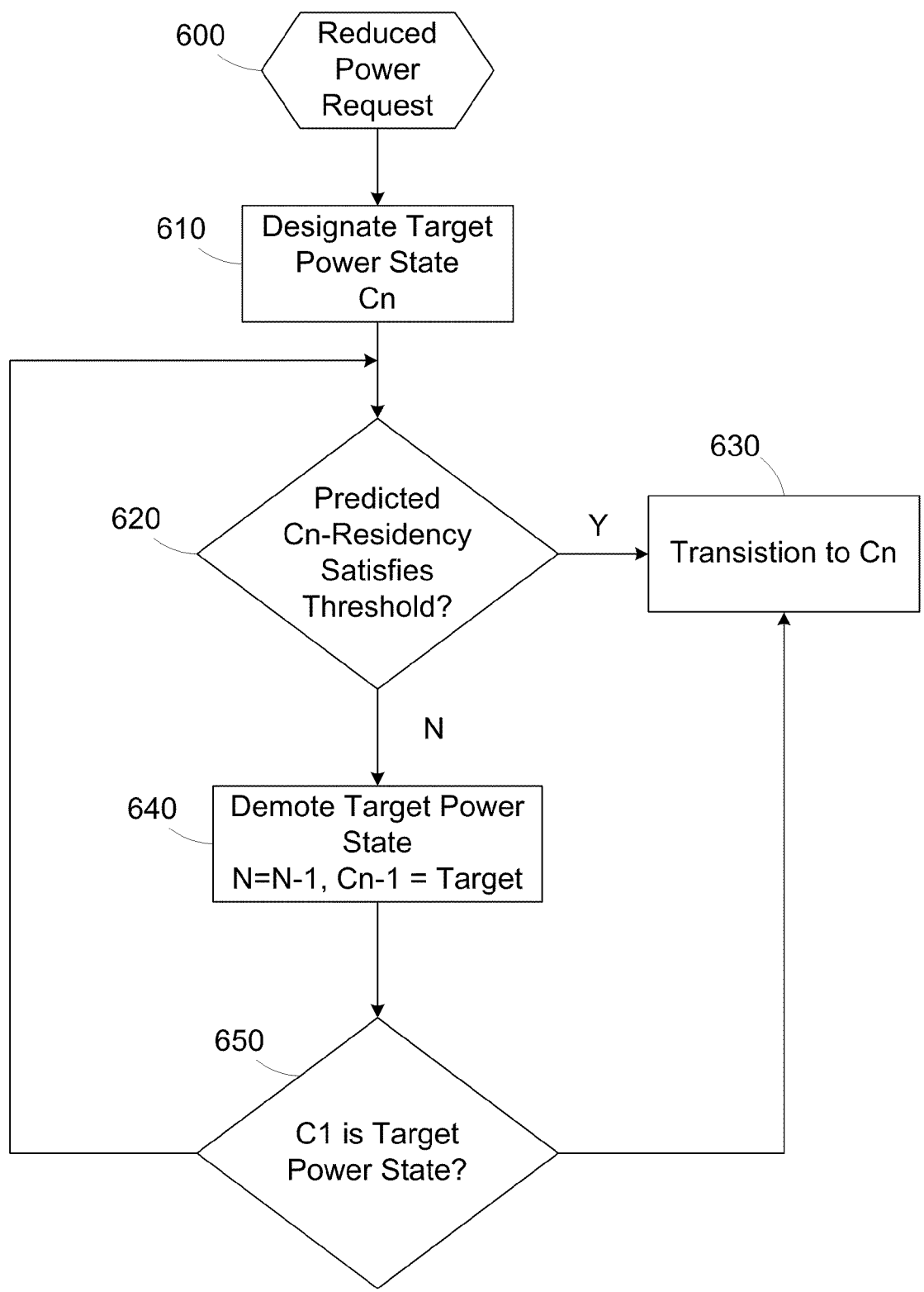
FIG. 6 is a simplified flow diagram of a method for controlling power state transitions in the device of FIG. 2.

FIG. 6 illustrates a simplified flow diagram of a method for determining power state transitions for a device 210 based on the activity rate predictor 500 illustrated in FIG. 5. Again, one activity rate predictor 500 may be provided for each reduced power state. In method block 600, a reduced power state request is received (i.e., from the operating system, other software which may or may not be directed by user interaction, or hardware power management logic). In method block 610, the power management control logic 220 (e.g., the power management controller 320) designates a target power state for the request. For example, the target power state may be the C6 state. In some embodiments, the target power state may be a configurable parameter of the device 210 that is controlled by user preferences or by the operating system based on the usage profile of the device and various parameters and selections made via user input through a user interface (e.g., a graphical user interface). For example, if the device 210 is configured using a power-saving profile, a target power state with a deeper level may be selected. However, if the device 210 is configured using a high performance profile, a shallower target power state may be used. The particular profile may be changed by the user or it may be changed automatically by the operating system or other software. For example, if external power is supplied, the high performance profile may be automatically selected. If the device is operating on battery power, the power-saving profile may be used.

In one embodiment, the power management control logic 220 estimates the residence time in the reduced power state (i.e., CN residency) based on the value of the activity counter 510 for the reduced power state. The counter value is inversely related to the residency. In method block 620, the power management control logic 220 determines if the predicted Cn residency satisfies a predetermined threshold for the target power state. Logically, this evaluation is implemented by comparing the associated residency threshold, ResThres_n to the value of the counter 510 for the power state. If the residency threshold is greater than or equal to the predicted activity request rate embodied by the counter value (i.e., ResThresh_n>=CNT_n), the reduced power state request is accepted and the device 210 transitions into the target power state, Cn, in method block 630. If the predicted Cn residency does not meet the threshold in method block 620, the target power state is demoted in method block 640 to Cn−1.

In some embodiments, if the demoted reduced power state is C1 in method block 650, the power management control logic 220 instructs the device 210 to transition to the target reduced power state, C1. In such cases, activity request rates are not checked for the C1 state, as it is a low exit latency state. Of course, an activity counter 510 may also be employed for the C1 state, and its values checked prior to allowing a transition to the C1 state. If the demoted target power state is deeper than C1 in method block 650, the power management control logic 220 returns to method block 620 to evaluate the new target power state.

In the embodiment shown in FIG. 2, each reduced power state request is started at the default deepest level. It is contemplated that in some embodiments, once a target power state has been demoted, it may remain demoted to that level. Separate target power state promotion logic may be employed to later promote the target power state.

Figure 7:
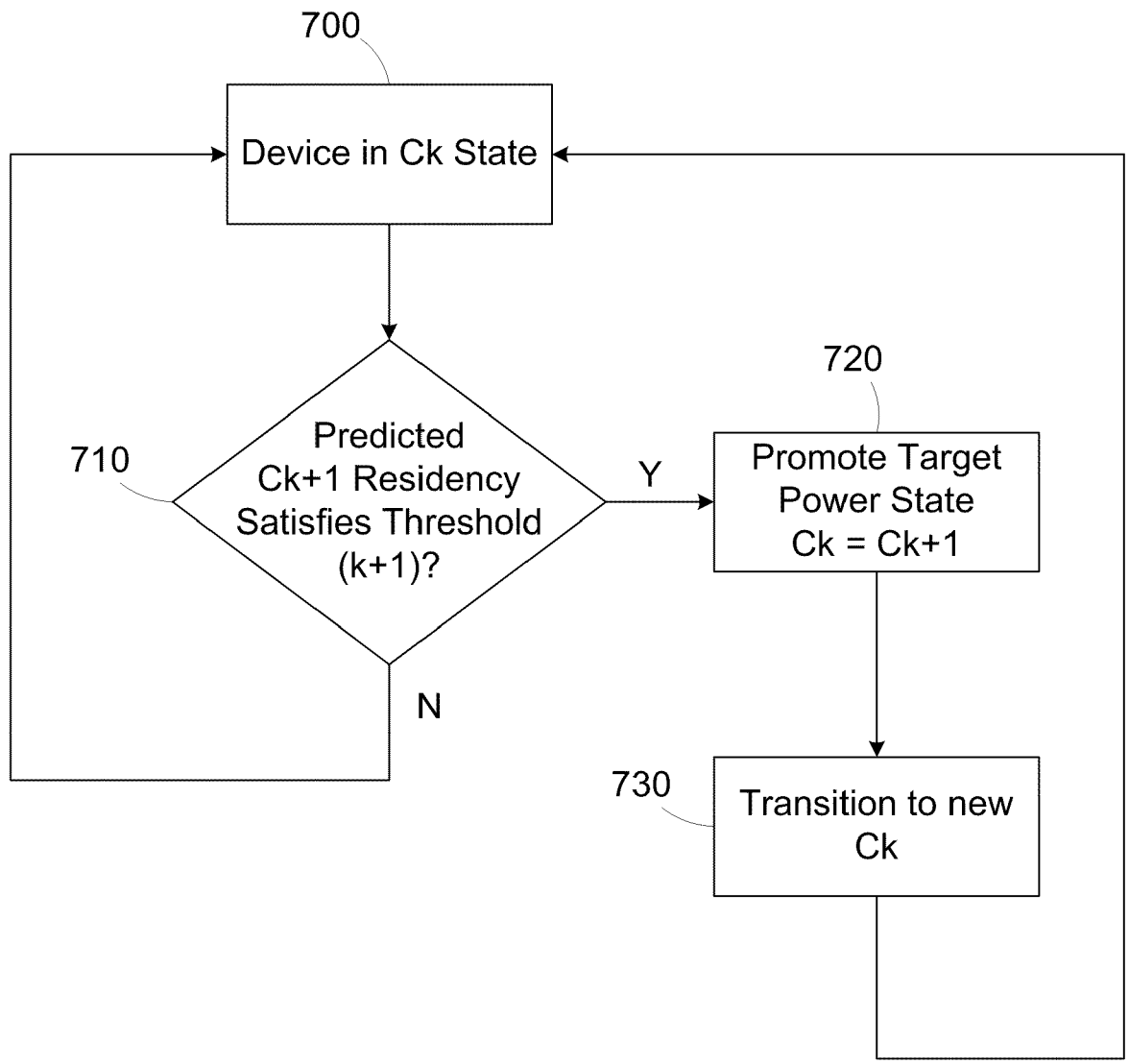
FIG. 7 is a simplified flow diagram of a method for promoting deepest target power states in the controlling of power state transitions in the device of FIG. 2.

FIG. 7 illustrates one example technique for promoting target power states. In method block 700, the device 210 is in a reduced power state, Ck. In method block 710 it is determined if the predicted residency for the next deeper power state, Ck+1, satisfies a predetermined threshold. Logically, this is implemented by determining if the counter threshold corresponding to the minimum residency for state k+1 is greater than or equal to the counter value, ResThresh_k+1>=CNT_k+1. If the device 210 stays in the power state, Ck, for a sufficiently long time period, the counter for the next deeper power state may decrement to a level indicating that it would be power efficient to use the deeper state. If the threshold for the deeper power state is met, the target power state may be promoted in method block 720 (i.e., Ck=Ck+1). Subsequently, the device 210 transitions to the new target power state, Ck, in method block 730 without requiring an intervening transition to the active state, C0. If the reduced power state residency is less than the threshold for the next deeper target power state in method block 710, the device 210 remains in the original reduced power state Ck. It is also contemplated that the logic implemented for method block 710 be modified in some embodiments to evaluate more than just the next deepest power state. Hence, the counters for more than one of the reduced power states may be evaluated to determine if more than one power state level may be skipped.

In some embodiments activity rate prediction is sufficient for making decision about deepest low power state (C-state). However, in other applications interrupt rate prediction may be combined with dynamic tracking of C0-residency for making decisions about deepest low power state that is power efficient. As seen in FIG. 4, which shows the intermix of the processor idle and active states, one can see that predicted residency in the low power state depends on two factors— activity rate and C0 residency. Even sparse activity rate combined with a long C0 residency will leave little time to stay in the low power state. C0-residency may be determined based on just the last C0-residency or based on a number of past C0-residencies residencies.

Figure 8:
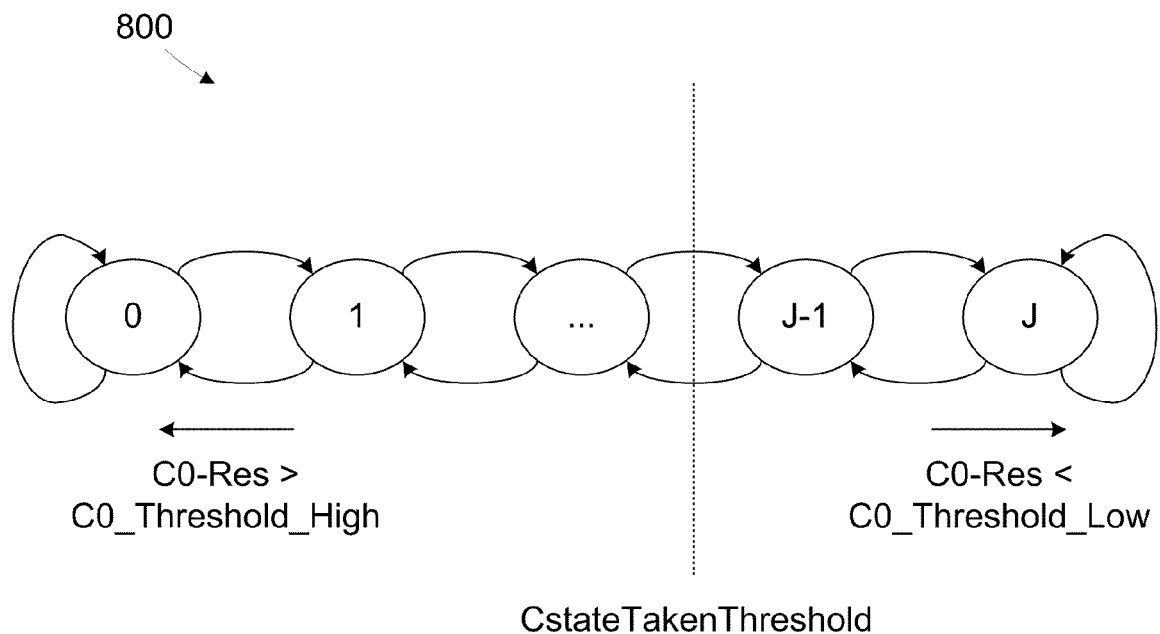
FIG. 8 is a simplified diagram of a saturation counter that may be used to track active state residency in the device of FIG. 2.

As shown in FIG. 8, for a C0-residency history approach, a saturation counter 800 counting up to configurable value J may be used. The saturation counter 800 is incremented every time the C0-residency is lower than a configurable time interval threshold, C0_Threshold_Low, and saturates at J. The C0-residency counter 800 is decremented every time the C0-residency is higher than another time interval configurable threshold, C0_Threshold_High, and saturates at 0.

If the counter value is greater than or equal to the CstateTakenThreshold, a transition to reduced power state Cn may be allowed from the C0-tracking standpoint. Such a counter value implies application idleness (i.e., only short periods of task execution separated by long periods of idleness) and positively qualifies transition into a reduced power state, Cn.

As with the activity rate predictors 500, a C0 residency counter 800 may be implemented for each power state, and the configurable parameters, C0_Threshold_High_n, C0_Threshold_Low_n, CstateTakenThreshold_n, and counter saturation limit, J_n, may have different values for each power state. Again, the values may also change depending on the power saving configuration of the device 210 (i.e., high performance versus power saving). In those embodiments where C0 residency is also tracked, the logic implemented by method block 620 in FIG. 6 may be implemented as:

ResThresh_$n$>=CNT_$n$ AND C0_CNT_$n$>CstateTakenThreshold_$n$.

Figure 9:
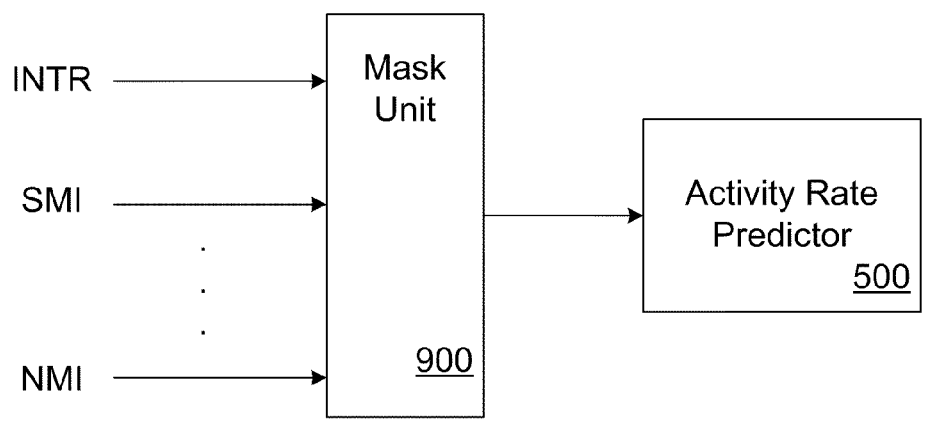
FIG. 9 is a simplified block diagram of a masking unit that may be used in conjunction with the activity rate predictor of FIG. 5 to distinguish between various types of activity requests.

In the previously described example, all activity requests are treated equally with respect to counting. However, in some embodiments, separate activity rate predictors 500 and their associated activity counters 510 may be provided for each type of activity request or interrupt. For example, conventional interrupts (INTR), system management interrupts (SMI), non-maskable interrupts (NMI), etc., may be individually tracked and selected types of activity requests may be masked based on the system configuration. As shown in FIG. 9, rather than duplicating the counters 510, it is also contemplated that a mask unit 900 may be used to mask certain types of interrupts prior to the request filter 520 and its counter 510. Only unmasked interrupts would pass through the mask unit 900 to be counted.

The techniques for controlling the transitioning into reduced power states described herein provide numerous advantages. Controlling the power transitions based on activity rates and possibly C0 residency allows the power savings and processing requirements to be balanced. Improved power management results reduced power consumption, and in a mobile application, extended battery life. The power savings achieved may be balanced against application requirements so that the transitions to lower power states do not detract from the user's experience by inducing noticeable visible, audible, or performance impacting skips or lag. The techniques also provide a flexible mechanism which may be controlled by the operating system, other software, and/or hardware, for placing the device 210 (e.g., one or more cores of a processor) in a reduced power state, while keeping all other system parts, including other processor cores, chipsets, I/O, and DRAM in a fully operational state.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method for transitioning power states in a device, comprising:

designating a first reduced power state as a target power state;

determining a first expected residency for the target power state based on a counting of activity requests associated with the device using a counter that is incremented responsive to receiving an activity request and decremented responsive to a predetermined time interval elapsing without an intervening activity request; and transitioning the device to the target power state responsive to the expected residency satisfying a first predetermined threshold.

2. The method of claim 1, further comprising:

demoting the target power state to a second reduced power state less deep than the first reduced power state responsive to the first expected residency not satisfying the first predetermined threshold;

determining a second expected residency for the demoted target power state based on the counting of the activity requests; and transitioning the device to the demoted target power state responsive to the second expected residency satisfying a second predetermined threshold.

3. The method of claim 1, wherein the device is operable to enter one of a plurality of reduced power states, the first reduced power state is selected from the plurality of reduced power states, and the method further comprises:

maintaining a counter for each reduced power state in at least a subset of the plurality of reduced power state; and determining the first expected residency for the target power state based on a value of the counter associated with the one of the reduced power states designated as the target power state.

4. The method of claim 3, wherein maintaining each counter comprises:

incrementing the counter responsive to receiving an activity request; and decrementing the counter responsive to a predetermined time interval elapsing without an intervening activity request.

5. The method of claim 4, wherein incrementing the counter further comprises incrementing the first counter using an increment interval different than a decrement interval used for decrementing the counter.

6. The method of claim 4, further comprising filtering the activity requests to limit the number of activity requests provided to the counter in a particular time interval.

7. The method of claim 1, further comprising:

determining a second expected residency for a second reduced power state deeper than the target power state based on the counting of the activity requests while the device is in the target power state;

promoting the target power state to the second reduced power state responsive to the second expected residency for the second reduced power state satisfying a second predetermined threshold; and transitioning the device to the promoted target power state.

8. The method of claim 1, further comprising:

determining an expected active state residency for the device; and transitioning the device to the target power state responsive to the first expected residency satisfying a first predetermined threshold and the expected active state residency satisfying a second predetermined threshold.

9. The method of claim 8, wherein determining the active state residency comprises:

incrementing a residency counter responsive to the device being in an active state for less than a first predetermined time interval; and decrementing the residency counter responsive to the device being in an active state for greater than a second predetermined time interval.

10. The method of claim 9, further comprising maintaining a residency counter for each of a plurality of reduced power states of the device, and determining the residency based on the residency counter associated with the target power state.

11. The method of claim 1, wherein the activity requests comprise a plurality of activity request types, and the method further comprises masking activity requests for at least one of the activity request types.

12. An apparatus, comprising:

control logic operable to designate a first reduced power state for a device as a target power state, determine a first expected residency for the target power state based on a counting of activity requests associated with the device using a counter that is incremented responsive to receiving an activity request and decremented responsive to a predetermined time interval elapsing without an intervening activity request, and transition the device to the target power state responsive to the expected residency satisfying a first predetermined threshold.

13. The apparatus of claim 12, wherein the control logic is further operable to demote the target power state to a second reduced power state less deep than the first reduced power state responsive to the first expected residency not satisfying the first predetermined threshold, determine a second expected residency for the demoted target power state based on the counting of the activity requests, and transition the device to the demoted target power state responsive to the second expected residency satisfying a second predetermined threshold.

14. The apparatus of claim 12, wherein the control logic comprises a counter for each reduced power state in at least a subset of the plurality of reduced power state, and the control logic is operable to determine the first expected residency for the target power state based on a value of the counter associated with the one of the reduced power states designated as the target power state.

15. The apparatus of claim 14, wherein the control logic is further operable to increment the counter responsive to receiving an activity request and decrement the counter responsive to a predetermined time interval elapsing without an intervening activity request.

16. The apparatus of claim 15, wherein the control logic is further operable to increment the counter using an increment interval different than a decrement interval used for decrementing the counter.

17. The apparatus of claim 14, wherein the control logic further comprises a filter coupled to the counter and operable to filter the activity requests to limit the number of activity requests provided to the counter in a particular time interval.

18. The apparatus of claim 12, wherein the control logic is further operable to determine a second expected residency for a second reduced power state deeper than the target power state based on the counting of the activity requests while the device is in the target power state, promote the target power state to the second reduced power state responsive to the second expected residency for the second reduced power state satisfying a second predetermined threshold, and transition the device to the promoted target power state.

19. The apparatus of claim 12, wherein the control logic is further operable to determine an expected active state residency for the device and transition the device to the target power state responsive to the first expected residency satisfying a first predetermined threshold and the expected active state residency satisfying a second predetermined threshold.

20. The apparatus of claim 12, wherein the control logic comprises a residency counter incremented responsive to the device being in an active state for less than a first predetermined time interval and decremented responsive to the device being in an active state for greater than a second predetermined time interval.

21. The apparatus of claim 20, wherein the control logic further comprises a plurality of residency counters for each of a plurality of reduced power states of the device, and the control logic is operable to determine the residency based on the residency counter associated with the target power state.

22. The apparatus of claim 12, wherein the activity requests comprise a plurality of activity request types, and the control logic further comprises a mask unit operable to mask activity requests for at least one of the activity request types.

23. The apparatus of claim 12, wherein the device comprises a processor.

24. The apparatus of claim 23, wherein the processor includes a plurality of processing cores, and the control logic is operable to manage the power states of the processing cores.

* * * * *